US009679455B2

(12) United States Patent
Jentoft et al.

(10) Patent No.: US 9,679,455 B2
(45) Date of Patent: Jun. 13, 2017

(54) SECURITY MONITORING WITH PROGRAMMABLE MAPPING

(71) Applicant: RSI Video Technologies, Inc., Vadnais Heights, MN (US)

(72) Inventors: Keith A. Jentoft, Circle Pines, MN (US); Jean-Michel Reibel, Vadnais Heights, MN (US)

(73) Assignee: RSI Video Technologies, Inc., Vadnais Heights, MN (US)

( * ) Notice: Subject to any disclaimer, the term of this patent is extended or adjusted under 35 U.S.C. 154(b) by 0 days.

(21) Appl. No.: 14/942,526

(22) Filed: Nov. 16, 2015

(65) Prior Publication Data

US 2016/0078734 A1 Mar. 17, 2016

Related U.S. Application Data

(63) Continuation of application No. 12/293,996, filed as application No. PCT/US2007/004773 on Feb. 23, (Continued)

(51) Int. Cl.
*H04N 7/18* (2006.01)
*G08B 13/196* (2006.01)
(Continued)

(52) U.S. Cl.
CPC . *G08B 13/19695* (2013.01); *G08B 13/19617* (2013.01); *G08B 13/19641* (2013.01);
(Continued)

(58) Field of Classification Search
CPC ............................. H04L 12/2602; H04N 5/232
(Continued)

(56) References Cited

U.S. PATENT DOCUMENTS 3,634,846 A   1/1972  Fogiel
3,803,594 A * 4/1974  Klein ..................... G08B 25/04
                                                 340/512
(Continued)

FOREIGN PATENT DOCUMENTS

DE          4423947        1/1996
DE       10150745 A1       4/2003
(Continued)

OTHER PUBLICATIONS

European Search Report, European Patent Application No. 15158810.0, 2 pages (Jul. 17, 2015).
(Continued)

*Primary Examiner* — Richard G Keehn
(74) *Attorney, Agent, or Firm* — Crawford Maunu PLLC

(57) ABSTRACT

An integrated security arrangement is implemented in a variety of embodiments. In one such embodiment an integrated security arrangement includes a plurality of intrusion sensors that sense an intrusion in a target area, a motion sensor, and an image-capture device that is responsive to the motion sensor. When the image-capture device is enabled it captures images of the target area in response to movement in the target area as indicated by the motion sensor. The integrated security arrangement also includes a mapping database that contains data used to associate one or more of the plurality of intrusion sensors with the image-capture device. A user configures the mapping database to select at least one of the intrusion sensors for enabling the image-capture device. The integrated security arrangement further includes a control unit that enables the image-capture device in response to the selected intrusion sensor as configured in the mapping database.

19 Claims, 10 Drawing Sheets

Related U.S. Application Data 2007, now Pat. No. 9,189,934, and a continuation-in-part of application No. 11/389,673, filed on Mar. 24, 2006, now Pat. No. 7,835,343, and a continuation-in-part of application No. 11/388,764, filed on Mar. 24, 2006, now Pat. No. 7,463,145.

(60) Provisional application No. 60/785,570, filed on Mar. 24, 2006, provisional application No. 60/719,369, filed on Sep. 22, 2005.

(51) Int. Cl.
  H04N 5/232 (2006.01)
  H04L 12/26 (2006.01)
  H04L 12/24 (2006.01)

(52) U.S. Cl.
  CPC .... G08B 13/19697 (2013.01); H04L 12/2602 (2013.01); H04L 41/0879 (2013.01); H04L 41/12 (2013.01); H04N 5/232 (2013.01)

(58) Field of Classification Search
  USPC .......................................................... 348/143
  See application file for complete search history.

(56) References Cited

U.S. PATENT DOCUMENTS

| | | | |
|---|---|---|---|
| 4,266,216 A | 5/1981 | Trusty | |
| 4,347,590 A | 8/1982 | Heger et al. | |
| 4,540,977 A | 9/1985 | Taillens et al. | |
| 4,772,875 A | 9/1988 | Maddox et al. | |
| D302,951 S | 8/1989 | Kotlicki et al. | |
| 4,857,912 A | 8/1989 | Everett, Jr. et al. | |
| 4,864,136 A | 9/1989 | Behlke | |
| 4,882,567 A | 11/1989 | Johnson | |
| D307,560 S | 5/1990 | Andrews et al. | |
| D312,054 S | 11/1990 | Melman | |
| 5,026,990 A | 6/1991 | Marman et al. | |
| 5,077,548 A | 12/1991 | Dipoala | |
| 5,155,474 A | 10/1992 | Park et al. | |
| 5,202,661 A | 4/1993 | Everett et al. | |
| 5,237,330 A | 8/1993 | Yaacov et al. | |
| 5,299,971 A | 4/1994 | Hart | |
| 5,382,944 A | 1/1995 | Dipoala et al. | |
| 5,398,057 A | 3/1995 | Tapp | |
| 5,424,718 A | 6/1995 | Muller et al. | |
| 5,448,290 A | 9/1995 | VanZeeland | |
| 5,448,320 A | 9/1995 | Sakai et al. | |
| 5,450,062 A | 9/1995 | DiPoala | |
| 5,473,368 A | 12/1995 | Hart | |
| 5,515,029 A | 5/1996 | Zhevelev et al. | |
| D381,283 S | 7/1997 | Soreo | |
| 5,657,076 A | 8/1997 | Tapp | |
| 5,661,471 A | 8/1997 | Kotlicki | |
| 5,693,943 A | 12/1997 | Tchernihovski et al. | |
| 5,703,368 A | 12/1997 | Tomooka et al. | |
| 5,790,040 A | 8/1998 | Kreier et al. | |
| D399,155 S | 10/1998 | Roberts | |
| 5,819,124 A | 10/1998 | Somner et al. | |
| 5,832,671 A | 11/1998 | White | |
| 5,850,180 A | 12/1998 | Hess | |
| D409,936 S | 5/1999 | Baldwin et al. | |
| 5,936,524 A | 8/1999 | Zhevelev et al. | |
| 5,980,123 A | 11/1999 | Heifler | |
| 6,037,902 A | 3/2000 | Pinhas et al. | |
| 6,049,273 A | 4/2000 | Hess | |
| 6,188,715 B1 | 2/2001 | Partyka | |
| 6,211,522 B1 | 4/2001 | Kotlicki et al. | |
| 6,246,320 B1* | 6/2001 | Monroe ............. B64D 45/0015 340/506 |
| 6,271,752 B1 | 8/2001 | Vaios | |
| 6,285,912 B1 | 9/2001 | Ellison et al. | |
| 6,292,508 B1 | 9/2001 | Hong et al. | |
| 6,411,209 B1 | 6/2002 | Lyons et al. | |
| 6,476,858 B1 | 11/2002 | Ramirez Diaz et al. | |
| 6,504,479 B1* | 1/2003 | Lemons ............. G07C 9/00087 340/430 |
| 6,636,738 B1 | 10/2003 | Hayashi | |
| D485,774 S | 1/2004 | Hwang et al. | |
| 6,686,952 B1 | 2/2004 | Brazier | |
| 6,690,414 B2 | 2/2004 | Lyons et al. | |
| 6,700,487 B2 | 3/2004 | Lyons et al. | |
| 6,724,421 B1* | 4/2004 | Glatt ............... G08B 13/19608 348/143 |
| 6,759,957 B2 | 7/2004 | Murakami et al. | |
| 6,768,294 B1 | 7/2004 | Moldavsky et al. | |
| 6,768,868 B1 | 7/2004 | Schnell | |
| 6,818,881 B1 | 11/2004 | Chernichovski et al. | |
| 6,819,239 B2 | 11/2004 | Bingham | |
| 6,940,405 B2 | 9/2005 | Script et al. | |
| 6,965,313 B1 | 11/2005 | Saylor et al. | |
| 6,970,183 B1 | 11/2005 | Monroe | |
| D516,445 S | 3/2006 | DiPasquale | |
| 7,079,028 B2 | 7/2006 | Herrmann et al. | |
| 7,081,817 B2 | 7/2006 | Zhevelev et al. | |
| D527,296 S | 8/2006 | Concari et al. | |
| 7,106,193 B2 | 9/2006 | Kovach | |
| 7,149,422 B2 | 12/2006 | Schnell | |
| 7,151,945 B2 | 12/2006 | Myles et al. | |
| 7,173,650 B2* | 2/2007 | Cohen-Solal ........ G01S 3/7865 348/143 |
| 7,463,145 B2 | 12/2008 | Jentoft | |
| 7,463,146 B2 | 12/2008 | Reibel et al. | |
| 7,471,334 B1 | 12/2008 | Stenger | |
| 7,619,512 B2 | 11/2009 | Trundle et al. | |
| 7,835,343 B1 | 11/2010 | Reibel | |
| 7,995,096 B1* | 8/2011 | Cressy ............. G08B 13/19691 348/143 |
| 8,081,073 B2 | 12/2011 | Reibel et al. | |
| 8,132,225 B2* | 3/2012 | Chand ................ H04L 63/10 340/506 |
| 8,155,105 B2 | 4/2012 | Reibel et al. | |
| 8,248,226 B2 | 8/2012 | Friar | |
| 8,259,816 B2 | 9/2012 | Coleman, Sr. | |
| 8,520,068 B2 | 8/2013 | Naidoo et al. | |
| 2001/0028798 A1 | 10/2001 | Manowitz et al. | |
| 2002/0005894 A1* | 1/2002 | Foodman ........... G06F 17/3089 348/143 |
| 2002/0052719 A1* | 5/2002 | Alexander ............ H04L 41/22 702/188 |
| 2002/0107613 A1* | 8/2002 | Hopkins ............. G06T 1/0007 700/269 |
| 2002/0131773 A1* | 9/2002 | Bigler .................. G03B 17/06 396/58 |
| 2002/0159770 A1 | 10/2002 | Moultrie | |
| 2002/0171557 A1 | 11/2002 | Wegener | |
| 2003/0065407 A1 | 4/2003 | Johnson et al. | |
| 2003/0128130 A1 | 7/2003 | Kao | |
| 2003/0169335 A1* | 9/2003 | Monroe ............. B64D 45/0015 348/143 |
| 2003/0193563 A1 | 10/2003 | Suzuki | |
| 2003/0202117 A1 | 10/2003 | Garner | |
| 2004/0086088 A1 | 5/2004 | Naidoo et al. | |
| 2004/0109059 A1 | 6/2004 | Kawakita | |
| 2004/0113778 A1 | 6/2004 | Script et al. | |
| 2004/0155781 A1 | 8/2004 | DeOme | |
| 2004/0190467 A1 | 9/2004 | Liu et al. | |
| 2004/0205823 A1 | 10/2004 | Tsai | |
| 2004/0205824 A1 | 10/2004 | Tsai | |
| 2004/0223062 A1* | 11/2004 | Pettegrew ............ F16M 11/12 348/211.4 |
| 2004/0239497 A1 | 12/2004 | Schwartzman et al. | |
| 2005/0018766 A1* | 1/2005 | Iwamura .......... G08B 13/19656 375/240.01 |
| 2005/0024206 A1 | 2/2005 | Samarasekera et al. | |
| 2005/0030180 A1 | 2/2005 | Pantus et al. | |
| 2005/0057649 A1* | 3/2005 | Marks .................. H04N 7/186 348/143 |
| 2005/0073580 A1 | 4/2005 | Takeda et al. | |
| 2005/0117033 A1* | 6/2005 | Matsui ................ H04N 5/262 348/239 |
| 2005/0134450 A1 | 6/2005 | Kovach | |

(56) References Cited

U.S. PATENT DOCUMENTS

| | | |
|---|---|---|
| 2005/0134454 A1 | 6/2005 | Eskildsen |
| 2005/0200494 A1 | 9/2005 | Herrmann et al. |
| 2005/0222933 A1* | 10/2005 | Wesby .................. G06Q 40/00 705/36 R |
| 2005/0275549 A1 | 12/2005 | Barclay et al. |
| 2006/0164233 A1* | 7/2006 | Meng .................. G08B 29/183 340/522 |
| 2006/0179463 A1* | 8/2006 | Chisholm ........ G08B 13/19656 725/90 |
| 2006/0250501 A1 | 11/2006 | Widmann et al. |
| 2007/0018106 A1 | 1/2007 | Zhevelev et al. |
| 2007/0036535 A1 | 2/2007 | Chee |
| 2008/0079561 A1 | 4/2008 | Trundle et al. |
| 2008/0259161 A1 | 10/2008 | Hellman et al. |
| 2008/0311878 A1 | 12/2008 | Martin et al. |
| 2010/0080548 A1 | 4/2010 | Peterson et al. |
| 2010/0092764 A1 | 4/2010 | Chung et al. |
| 2010/0289644 A1 | 11/2010 | Slavin et al. |
| 2011/0183643 A1 | 7/2011 | Martin et al. |
| 2012/0086767 A1 | 4/2012 | Lau et al. |
| 2012/0314901 A1 | 12/2012 | Hanson et al. |
| 2013/0148950 A1 | 6/2013 | Chang |

FOREIGN PATENT DOCUMENTS

| | | |
|---|---|---|
| EP | 676733 A | 10/1995 |
| EP | 811959 A | 12/1997 |
| EP | 0856826 A2 | 8/1998 |
| EP | 0986038 | 3/2000 |
| EP | 1115264 A2 | 7/2001 |
| EP | 1363260 A1 | 11/2003 |
| EP | 1499098 A1 | 1/2005 |
| EP | 1575009 | 9/2005 |
| EP | 1316933 B1 | 8/2006 |
| GB | 2325548 A | 11/1998 |
| GB | 2358504 A | 7/2001 |
| GB | 2395336 | 5/2004 |
| JP | 01236397 A | 9/1989 |
| JP | 11154292 A | 6/1999 |
| JP | 2003233889 A | 8/2003 |
| JP | 2005071064 A | 3/2005 |
| WO | 8800747 | 1/1988 |
| WO | 9725696 | 7/1997 |
| WO | 0003367 A1 | 1/2000 |
| WO | 0127763 | 4/2001 |
| WO | 0246919 A2 | 6/2002 |
| WO | 2004064355 A2 | 7/2004 |
| WO | 2004079684 A1 | 9/2004 |
| WO | 2004114648 A2 | 12/2004 |
| WO | 2005034060 | 4/2005 |
| WO | 2005065196 A2 | 7/2005 |

OTHER PUBLICATIONS

Indoor MotionViewer DCV601, Datasheet [online]. RSI Video Technologies, 2220-IMVIS Mar. 2012 (Feb. 22, 2013). http//www.videofied.com.au/pdf/2013/installation.

Crystal Canyons Photography; "Jon's 3D Guide"; Nov. 10, 2004; www.orystalcanyons.net.

* cited by examiner

FIG. 4

| Camera 1 | Sensor A, B and C | Sensor D, E, and F | Additional Data |
|---|---|---|---|
|  |  |  |  |
|  |  |  |  |
|  |  |  |  |
|  |  |  |  |
|  |  |  |  |
|  |  |  |  |
|  |  |  |  |
|  |  |  |  |
|  |  |  |  |
|  |  |  |  |
|  |  |  |  |
|  |  |  |  |
|  |  |  |  |
|  |  |  |  |
| Camera N | Sensor X, Y and Z | Sensor U, V and W | Additional Logic |

402 — 404 — 406 — 408

SECURITY MONITORING WITH PROGRAMMABLE MAPPING

RELATED PATENT DOCUMENTS

This patent document is a continuation under 35 U.S.C. §120 of U.S. patent application Ser. No. 12/293,996 filed on Jan. 26, 2009 (U.S. Pat. No. 9,189,934), which is the national stage filing under 35 U.S.C. §371 of International Application No. PCT/US2007/004773 filed on Feb. 23, 2007; which PCT/US2007/004773 is a continuation-in-part and claims priority to common aspects of: U.S. patent application Ser. No. 11/389,673 (U.S. Pat. No. 7,835,343), entitled "Spread Spectrum Communications For Building-Security Systems," filed on Mar. 24, 2006; U.S. patent application Ser. No. 11/388,764 (U.S. Pat. No. 7,463,145), entitled "Security Monitoring Arrangement And Method Using A Common Field Of View," filed on Mar. 24, 2006, and which claims benefit of U.S. Provisional Application Ser. No. 60/719,369, filed on Sep. 22, 2015; and which PCT/US2007/004773 also claims benefit of U.S. Provisional Application Ser. No. 60/785,570, entitled "Motion-Image Monitoring Method and Device," filed on Mar. 24, 2006. Priority is claimed for common subject matter, under 35 U.S.C. §120, to each of these underlying patent documents.

FIELD OF THE INVENTION

The present invention is directed to a security arrangement and method for monitoring the inside of a facility or residence.

BACKGROUND

Home, office and other building-security systems are often used for safeguarding valuable possessions and for personal protection. These systems are typically implemented using different monitoring devices, such as cameras, motion sensors, keypads or contact sensors. Many buildings have multiple locations that are monitored for security purposes, requiring multiple monitoring devices in the different locations. For increased security and functionality, the monitoring devices can be configured to communicate with one or more central control devices. The central control device can, among other things, perform monitoring or recording functions, determine whether the building-security has been breached and whether to contact security personnel.

One method of communicating between the monitoring devices and the central control device is by a physical connection, such as electrical or other wiring. Using wiring to establish communication between the security devices can be troublesome for a number of reasons, such as the high cost of installation and maintenance. For example, exposed wiring is often unacceptable in a building, and thus, the installation of the security system requires passing the wires through the walls of the building. This type of installation can significantly increase the time required to complete a security system installation. Moreover, the troubleshooting and repair of the security system can be difficult because there is limited access to the unexposed wiring. The cost of the wire is another factor, especially in large buildings requiring numerous monitoring devices.

One potential solution is to use wireless monitoring devices to reduce or eliminate the need for physical connections between the devices, however, wireless security systems also have a set of problems, such as battery life. Ideally, the security devices would be self-powered by, for example, a battery. Self-powered devices are more secure because they are not subject to failure upon loss of power to the building. They also require less installation problems because they do not need to be connected to a separate power source; however, self-powered devices often have reliability issues due to the finite life of their power source. Increasing the useable time of a power source reduces the cost for replacement of the power source and increases the security of the entire system by having less potential downtime of the system or its components. Several recent developments have increased the potential power requirements of wireless security devices.

For example, the use of wireless communications in home, office and other buildings has been steadily increasing, creating additional issues with wireless security systems. One such issue is the increased potential for corrupted data due to interference between different wireless communications devices. This issue may also be present when an unauthorized person attempts to disrupt the security system by "jamming" the wireless communications using a wireless interference device. Techniques exist for reducing unwanted interference, however, the implementation of some of the techniques result in increased power requirements. Two such techniques, both of which can result in increased power requirements, include increasing the power of the transmission or varying the frequency of the transmission.

Another problem with power requirements arises from the desire to have increased monitoring capabilities with smaller devices. As security systems become more advanced, the power requirements of the monitoring devices are often increased. For instance, monitoring devices that contain digital cameras require enough power to run the camera, to store the digital picture in memory and to transmit the digital picture to the control device. The increased functionality of the monitoring devices, along with the desire to have smaller, less noticeable devices with less room for batteries or other power sources, has impacted the reliability of the monitoring devices.

Implementing a wireless building-security system can be further complicated by industry or government regulations. One such set of regulations is imposed by the Federal Communications Commission (FCC). The current regulations cover numerous aspects of wireless communications systems including, but not limited to, a range of restricted frequencies, a minimum number of different hopping frequencies within the allowable frequencies, the maximum output power of a transmitter and a requirement related to equal use of the hopping frequencies.

Attempts have been made to implement wireless security systems using a variety of methods. One such method is taught by European Patent Application Publication No. EP 1 363 260 filed on May 6, 2003, entitled "Procédé communication radiofréquence entre plusieurs dispositifs et système de surveillance mettant en œuvre un tel procédé," which is fully incorporated herein by reference. Yet, these methods still leave room for improvement.

In order to protect residents, employees, personal property, and the like, security monitoring systems are used to monitor a variety of facilities and to sense the presence of unwanted intruders. Many such security systems are connected to a central control unit and monitored by an operator who can alert the appropriate emergency services in the event of an unwanted intruder. Typically, a home monitoring security system includes a combination of sensing devices and alarm devices and some also include cameras. To achieve the maximum monitoring coverage, these devices are distributed throughout the interior of the facility.

Security systems that employ cameras are advantageous in that they are able to record activity associated with a suspected breach of the facility and also can be used by a monitoring station to prevent false alarms. In some instances, however, the cameras record the regular activities of the facilities' residents and/or employees. The cameras also record activities that are falsely perceived to be security breaches such as pet behaviors and authorized users that have been accidentally locked out.

In specific situations, such as those having the potential to violate the privacy of authorized residents and/or employees of the facility, such comprehensive recordation by the security cameras may be undesirable. Since unwanted intruders could breach the security of a facility while the inhabitants are present, it is necessary for the security monitoring system to be functioning at all times. However, having cameras constantly being triggered to record the inhabitants' daily living and working routines is a dramatic invasion of the inhabitants' privacy, and is burdensome with respect to false triggers. Further, the monitoring and recording of guests' activities can be just as invasive.

Moreover, the installation and configuration of the various cameras and devices often requires complex and time-consuming installation procedures.

The above-discussed issues have presented challenges to developing a home and/or facility security monitoring system that provides maximum coverage while minimizing one or more of the above-identified issues.

SUMMARY

The present invention is directed to the above and related types of integrated security systems. These and other aspects of the present invention are exemplified in a number of illustrated implementations and applications, some of which are shown in the figures and characterized in the claims section that follows.

In one embodiment of the present invention, an integrated security arrangement includes a plurality of intrusion sensors that sense an intrusion in a target area, a motion sensor, and an image-capture device that is responsive to the motion sensor. When the image-capture device is enabled it captures images of the target area in response to movement in the target area as indicated by the motion sensor. The integrated security arrangement also includes a mapping database that contains data used to associate one or more of the plurality of intrusion sensors with the image-capture device. A user configures the mapping database to select at least one of the plurality of intrusion sensors for enabling the image-capture device. The integrated security arrangement further includes a control unit that enables the image-capture device in response to the selected intrusion sensor as configured in the mapping database.

In another embodiment of the present invention, an integrated security arrangement is implemented. The arrangement has a plurality of intrusion sensors to sense an intrusion and a motion sensor to sense motion in a target area. An image-capture device captures images of the target area in response to the motion sensor and at least one selected one of the intrusion sensors. A control arrangement uses a mapping database that contains data used to associate one or more of the plurality of intrusion sensors with the image-capture device. The control arrangement permits a user to configure the mapping database to select said at least one of the plurality of intrusion sensors to which the image-capture device is responsive.

In another embodiment of the present invention, an integrated security arrangement is implemented. The arrangement has an intrusion sensor to sense an intrusion and a plurality of motion sensors to sense motion in respective target areas. A selected at least one of a plurality of image-capture devices, each associated with respective ones of the plurality of motion sensors, captures images of the respective target area in response to the respective motion sensor and the intrusion sensor. A control arrangement includes a mapping database that contains data used to associate the intrusion sensor with the selected image-capture device. The control arrangement permits a user to configure the mapping database to select said at least one of a plurality of image-capture devices that which is responsive to the intrusion sensor.

In another embodiment of the present invention, an integrated security arrangement includes an intrusion sensor to detect an intrusion, a plurality of motion sensors, and a plurality of image-capture devices. Each of the image-capture devices is responsive to a respective one of the motion sensors and when the image-capture devices are enabled they capture images of respective target areas in response to movement in the respective target areas as indicated by the respective motion sensors. The integrated security arrangement also includes a mapping database that contains data used to associate one or more of the plurality of image-capture devices with the intrusion sensor. The mapping database is configurable by a user. The integrated security arrangement further includes a control unit that enables one or more of the plurality of image-capture devices in response to the intrusion sensor detecting an intrusion. The control unit determines whether to enable one or more of the image-capture devices based upon data in the mapping database.

Commensurate with another embodiment of the present invention, an integrated security arrangement is implemented with a mapping database for mapping sensors/detectors other than intrusions sensors to various image-devices. The detection of an event by a sensor triggers the correspondingly mapped image-device to capture images of a target area.

The above summary of the present invention is not intended to describe each illustrated embodiment or every implementation of the present invention. The figures and detailed description that follow more particularly exemplify these embodiments.

BRIEF DESCRIPTION OF THE DRAWINGS

The invention may be more completely understood in consideration of the detailed description of various embodiments of the invention in connection with the accompanying drawings, in which:

FIG. 4 shows an example mapping or lookup table, according to an example embodiment of the present invention;

Figure 1:
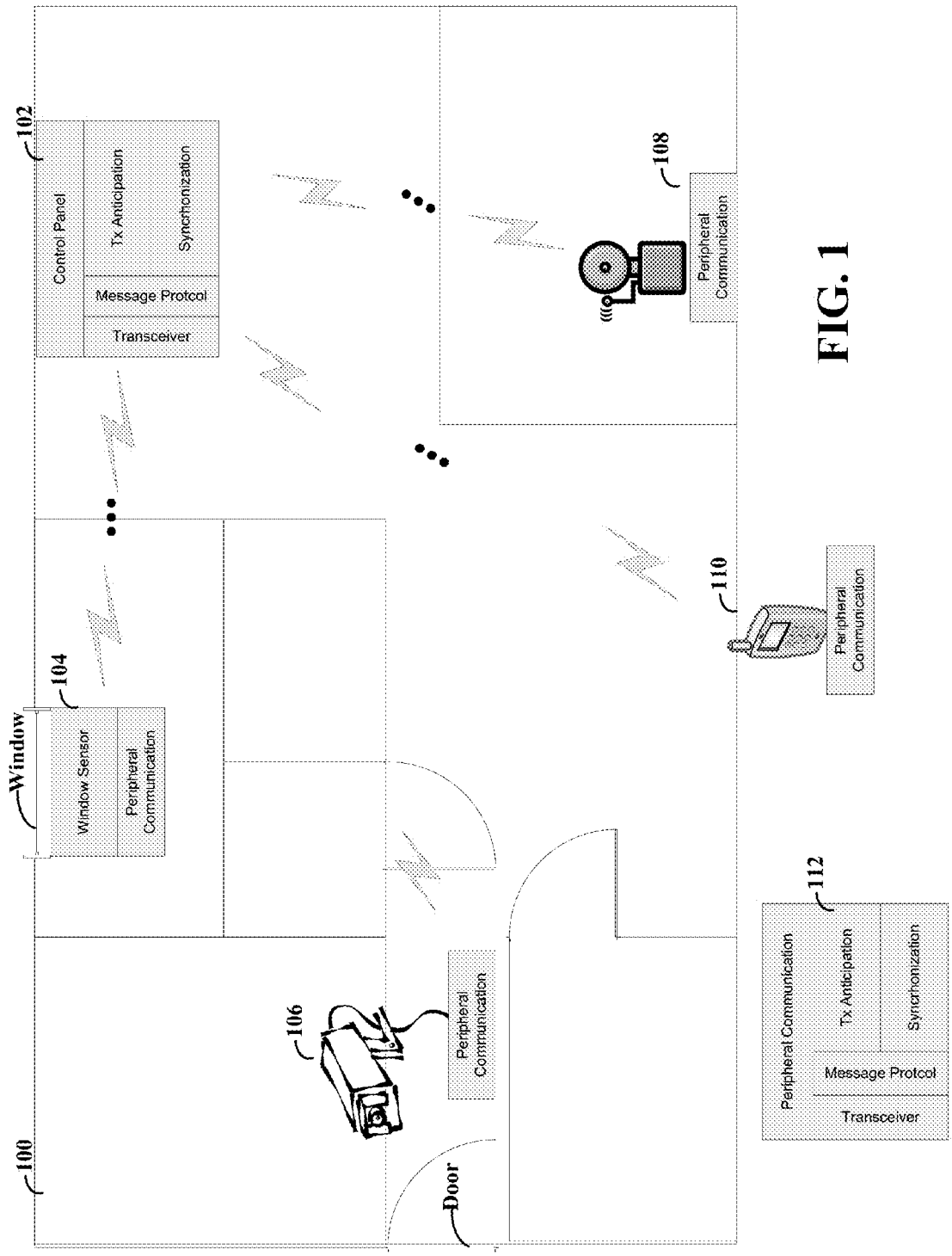
FIG. 1 depicts a building-security system according to an example embodiment of the present invention.

While the invention is amenable to various modifications and alternative forms, specifics thereof have been shown by way of example in the drawings and will be described in detail. It should be understood, however, that the intention is not necessarily to limit the invention to the particular embodiments described. On the contrary, the intention is to cover all modifications, equivalents, and alternatives falling within the spirit and scope of the invention as defined by the appended claims.

DETAILED DESCRIPTION

The present invention is believed to be applicable to a variety of different approaches and arrangements for providing security services. The invention has been found to be particularly advantageous for addressing security monitoring needs in a residence or private-office environment.

According to an example embodiment, a security system utilizes cameras to detect and identify intruders. The system includes an integrated camera/motion detector that is responsive to intrusion sensors and other types of sensors/alarms (e.g., a smoke detector, a carbon monoxide detector, a gas detector, or a panic button). For simplicity, the following discussion focuses on the integrated camera/motion detector being responsive to intrusion detection; however, the discussion is equally applicable to the integrated camera/motion detector being responsive to other types of sensors and alarms as well. The camera's smart-behavior results in reduced power consumption and mitigates privacy concerns on various levels. A system user sets up zones with at least one intrusion sensor (e.g., door/window contacts, glass-break detectors, hyper frequency radar detector, or an infrared barrier) for each zone around the perimeter of a facility and sets up corresponding camera/motion detectors in the interior of the facility. The intrusion sensors are activated (armed) by a system user, using, e.g., a keypad on a security panel, a remote control keyfob, a phone call using DTMF, a personal computer or a remote server. This allows for a complete activation of the system when the system user leaves the facility as well as a partial perimeter activation of the facility when the system user (or other authorized person) is present. Thus, when the user is present the camera remains "off" unless appropriately triggered by the motion detector. However, the motion detector also remains "off" unless it is armed by a corresponding intrusion sensor. Therefore, cameras record images inside the facility when both an intrusion sensor has been tripped and a motion detector has detected motion. In one implementation, the system user enters a code (e.g., using a keypad on a security panel) to identify the desired mode of system operation. In another implementation, the system user enters a system access code and then selects that desired mode of operation from a display.

Another example embodiment is directed to an integrated security arrangement. The arrangement includes an intrusion sensor to sense an intrusion at a target area of a facility, a second sensor to sense movement, an image-capture device, and a base unit. The image-capture device captures images in response to an intrusion indication from the intrusion sensor and in response to a movement indication from the second sensor. The base unit integrates a direction of view of the second sensor and of the image-capture device, thereby directing the second sensor to sense in the target area in which the images are captured by the image-capture device.

FIG. 1 depicts a building-security system according to an example embodiment of the present invention. FIG. 1 includes building 100, control panel 102, and peripheral devices 104-110. The security system is implemented in such a manner so as to reduce the power consumption of one or more of the control panel and peripheral devices as related to the wireless communications between the devices. When implementing the wireless communications, the devices use multiple frequencies (channels) as well as communication intervals. The devices are able to reduce the power consumption by utilizing information regarding a specific frequency from the multiple frequencies used and the communication interval. For example, if the transmitting devices modify their transmissions based upon the information, a receiving device may reduce the power consumption by decreasing the time the receiving device is listening for a transmission from another device. By reducing the power consumption, the system lends itself to implementing bi-directional communications between the devices, which typically require more power consumption than unidirectional communications.

The jagged lines and ellipses found between control panel 102 and the peripheral devices represent wireless communications between the control panel and the peripheral devices. The wireless communications may be implemented using suitable frequencies. For instance, wireless communications frequencies in industrial, scientific and medical (ISM) radio bands (900 Mhz, 2.4 Ghz and 5.8 Ghz) have been found to be suitable for security systems; however, alternate frequencies may be implemented in accordance with the particulars of the system or its intended implementation.

The various elements of the peripheral devices and the control panel are implemented using one or more of electric circuit arrangements, processors, memory elements, software code, programmable logic devices, input/output interfaces or combinations thereof.

Building 100 represents a facility for which the building-security system is implemented. Common implementations of building 100 include, but are not limited to, residential homes, retail stores, office buildings, government buildings, museums and other facilities. Typically, the security system will monitor several locations within building 100. Accordingly, FIG. 1 depicts various peripheral devices throughout the building.

Peripheral communications devices 104-110 may take the form of a variety of different devices, a few of which are depicted in FIG. 1. For instance, device 104 depicts a window sensor that may, among other things, detect when the window has been opened or otherwise compromised; device 106 depicts a camera for video capture; device 108 depicts an alarm; and device 110 depicts a mobile peripheral, such as a key fob for interfacing with the control panel or another peripheral. Other example sensors include but are not limited to fire alarms, carbon dioxide sensors and panic buttons. These peripheral devices communicate with control panel 102 using wireless communications.

Block 112 depicts several elements that may be implemented in the peripheral devices, including a transceiver block, a message protocol block, a synchronization block and a transmit (Tx) anticipation block. Various embodiments of the present invention use one or more of these blocks. In one such embodiment, a peripheral device wirelessly transmits a signal using the transceiver block. The peripheral device uses information regarding a transmission period and the listening channel of the control panel in the transmission process.

In one embodiment, the peripheral devices transmit building-security information to the control panel. For instance, device 106 might transmit video images or device-status information to the control panel, while device 104 might transmit information relating to the window's sensor.

FIG. 1 depicts control panel 102 as including a transceiver block, a message protocol block, a synchronization block and a transmit (Tx) anticipation block. Various embodiments of the present invention use one or more of these blocks. In one such embodiment, the transceiver block is used for receiving signals from one of the peripheral devices as a function of the communication intervals and the frequency the control panel uses to listen for transmissions. The listening frequency is one of several potential frequencies available for communication between the peripheral devices and the control panel. For instance, the system may use a number of contiguous frequency slots (channels) within a suitable frequency band. One example of such a use includes 25 or more channels within the ISM frequency band from 902-928 MHz. Numerous other combinations of channels and frequency bands are possible using the present invention.

Typically, the control panel and peripherals are implemented using a similar set of elements as depicted by blocks 102 and 112; however, various components may be implemented differently. For instance, the synchronization block can be implemented differently in the control panel versus the peripheral devices where the control panel provides synchronization information to each of the peripherals and the peripherals must use the synchronization information to maintain synchronization using a local clock. In such an instance, the peripherals would compare the synchronization information with the local clock in order to compensate for any difference between the peripherals' time frames and the control panel's time frame. The synchronization information can take the form of a time index, such as a counter value, a current time of day or any other time based data which the peripheral can use as a reference for synchronization. In another example, the time index can be a reference within each message transmitted. Using such a system the peripheral device can compare when the message was received to when the message was expected. The peripheral device may also be configured to adjust the local clock using a compensation for a timing error. For instance, if the peripheral clock appears to be running slower than the control panel, the peripheral can compensate by increasing the clock frequency or using a counter to compensate for the differences between clocks.

The control panel and the peripheral blocks are depicted as having a transceiver; however, the system may be implemented using variations of receivers and transmitters. In some instances, a peripheral may be implemented with only a transmitter. In other instances, a peripheral may be implemented with only a receiver. Other implementations allow for one or more of the control panels and peripherals to have both a transmitter and receiver (transceiver). Thus, transceiver is used herein to describe a receiver, transmitter or both a receiver and transmitter.

One embodiment of the present invention reduces the power of one of the devices as a function of the listening channel and a communications period. The system decreases the length of time that a receiver is active by using the communications period and listening channel to reduce the window of time necessary to receive the start of a transmission. When the receiver is not active, various methods of power reduction are employed, such as removing power from the receiving devices or reducing or stopping selected functions (e.g., amplification or processing).

Another embodiment synchronizes the various peripheral devices with the control panel. The synchronization can further reduce the active time of the transmitter because, for example, the transmitter may limit the transmission times relative to the times for which the receiver is active. Such a reduction can be accomplished because, for example, in many systems the transmission time cannot be shorter than the Rx activation period of the receiver without knowledge of when the Rx activation occurs; however, synchronization can reduce the transmission times to less than the Rx activation period of the receiver.

In a specific example, the control panel sends periodic synchronization messages to the peripheral devices. A peripheral device that determines it has lost synchronization with the control panel can increase the active time of the receiver to compensate for the loss in synchronization. In the event that the peripheral device is no longer receiving synchronization messages, the device can increase the active receive time to ensure that a transmission from the control panel will be received. The peripheral device can increase the activation time based upon an expected accuracy of the local tracking (e.g., local clock) of the control panel timebase. For instance, where the expected accuracy of the local tracking is relatively high, the peripheral device increases the activation time only upon the loss of several synchronization messages.

Some devices, such as a keyfob or other handheld device (110), are portable and are often removed from the wireless communication range of the rest of the system or may cease to receive or transmit information in response to a period of inactivity. Thus, the portable devices often lose synchronization during the time they are unable to communicate with the control panel. Accordingly, such portable devices frequently increase the activation time to compensate for the lack of synchronization between the portable devices and the control panel. The frequent increase in activation time often leads to a high rate of power consumption. To compensate, portable devices can be implemented to shut down transmission monitoring efforts until an external action occurs, such as a button being pressed.

In one embodiment of the present invention, the messages sent by the control panel are received by multiple peripheral devices simultaneously. Where the message is not intended for all the peripherals, the message can include information that indicates for which peripheral the message is intended. The message can also be associated with a channel that the control panel uses for an acknowledge message from the peripheral.

Figure 1A:
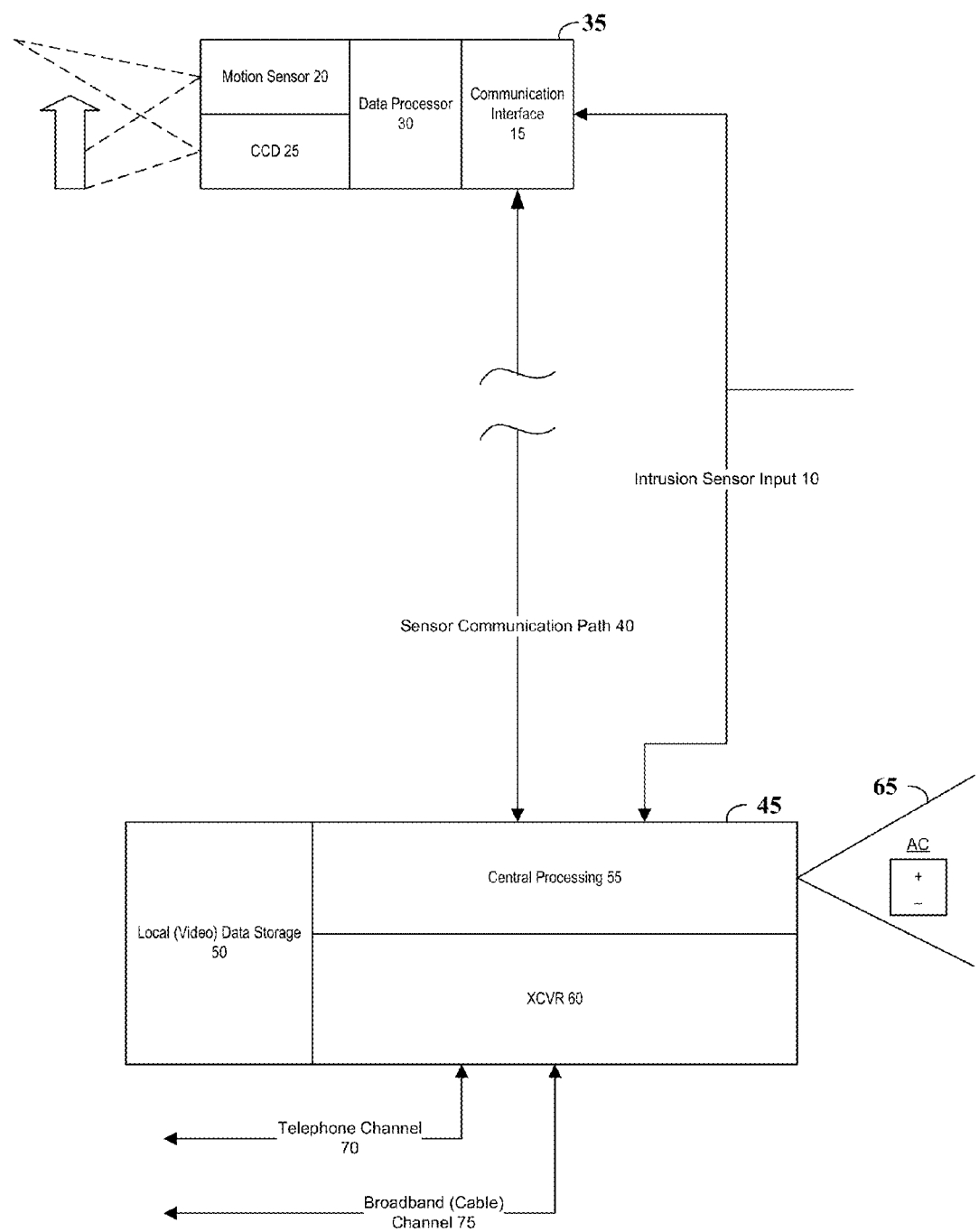
FIG. 1A illustrates an example embodiment of an integrated security system, according to the present invention.

FIG. 1A illustrates an example embodiment of an integrated security system, according to the present invention. A base unit 35 is located in the interior of a facility and integrates a motion sensor 20, a camera 25 (e.g., CCD camera), a data processor 30, and a communication interface 15. In one implementation the motion sensor is a passive infrared (PIR) sensor, which detects infrared energy in a target area and, in connection with a processor 30, recognizes changes in infrared energy (e.g., temperature changes) to detect motion. Depending on the size of the facility, multiple base units are located throughout the facility's interior, with a control panel 45 acting as a conventional communication hub for the facility. The control panel 45 interfaces with the base unit 35 via communications interface 15. In the event that an intrusion signal 10 is received by the control panel 45 from an intrusion sensor, the control panel arms motion sensor 20 allowing the motion sensor to activate the camera 25 when movement is detected. The control panel 45 can also directly activate the camera 25 (e.g., without regard to motion sensor 20). In one implementation, the base unit 35 can receive the intrusion sensor input 10 via communications interface 15. The sensor input 10 can therefore inform either the base unit 35 or the control panel 45 to arm the motion sensor 20 and/or activate the camera 25. When unarmed, the motion sensor 20 will not be able to activate camera 25 but may still detect motion. The motion sensor 20 can detect motion in its field of view, and once the motion sensor is armed, the motion sensor is able to activate the camera 25. The motion sensor 20 and the camera 25 are positioned such that both devices have overlapping fields of detection. Thus, images of the source of the detected motion are recorded by the camera without requiring any intervening adjustment or alignment. The recorded images are processed by a data processor 30, which can be integrated with the motion sensor 20 and the camera 25 in a base unit 35 as shown, or may be located remotely and electrically coupled to the base unit 35.

It will be appreciated that the data processor 30 can be implemented, for example, in the form of a high-speed processor such as a DSP (including an ALU) and/or a more general-purpose processor that may be optionally programmed for video data (de)compression. Thus, various embodiments may include a variety of combinations of processing operations with one or more aspects of the processing operations performed at one or more local or remote processors. For example, both video data storage and compression may be performed in the base unit 35 by the data processor 30. When the processor is located remotely, the data storage may still occur in base unit 35, but compression of the video data could be implemented in the remote processor. Another embodiment may involve data storage in the base unit 35 without any compression of the video data. Moreover, each of the above operations may be performed in combination with a central processor 55, as further discussed below.

In example implementations the base unit 35 is a battery-operated, wireless device having both motion sensing and image-capture capabilities. For further information on such a device, reference may be made to filed provisional application Ser. No. 60/785,570 filed on Mar. 24, 2006, entitled "Motion-Image Monitoring Method and Device", which is fully incorporated herein by reference. In certain implementations, data processor 30 is configured to preserve battery life by communicating in accordance with appropriate power-saving protocols. For example implementations related to communicative coupling and data transfer among the above-discussed devices in accordance with appropriate protocols, reference may be made to U.S. application Ser. No. 11/389,673 filed on Mar. 24, 2006, entitled "Spread Spectrum Communications for Building-Security" and European Patent Application Publication No. EP 1 363 260 filed on May 6, 2003, entitled "Procédé communication radiofréquence entre plusieurs dispositifs et système de surveillance mettant en œuvre un tel procédé," which are herein fully incorporated by reference. The power-saving approaches also provide for limited activation of the above-discussed camera such that the privacy of the inhabitants of a residence or facility is largely maintained.

The recorded images are transmitted over a bi-directional sensor communication path 40 to a control panel 45. In one implementation, the sensor communication path 40 is wireless and can be employed, e.g., as described in the above two incorporated patent documents. The transmitted images may be encrypted by the data processor 30 before being transmitted to the control panel 45. The control panel 45 includes a local storage area for the recorded images 50, the central processing unit 55, and a transceiver 60. The control panel 45 is located within the same facility as the base unit 35. The central processor 55 receives images from each of the base units located within the facility. Similar to the above discussion, the central processor 55 may perform a variety of processing operations alone or in combination with data processor 30. The images may optionally be stored in data storage 50 for further review or processing. The control panel 45 includes a battery backup power source 65 in the event of a loss of power, e.g., a natural disaster or an intruder disables power to the facility. The transceiver 60 further transmits signals including system status reports or recorded images via a telephone channel 70 or cable channel 75 to outside monitoring facilities. The telephone channel 70 and cable channel 75 are not limited to PSTN or broadband channels; they may be part of a GSM/CDMA network. Outside monitoring facilities may include a private security company or a local law enforcement station.

In another example embodiment, when an intrusion sensor senses an intruder breaching the facility (e.g., door/window contact is tripped), the intrusion signal 10 is transmitted directly to the control panel 45. The control panel 45 arms one or more base units 35 in the same zone as where the intrusion signal (via sensor 10) originated. For example, in response to a widow contact being tripped in a room the control panel 45 can arm the sensor 20 of base unit 35 in that room, as well as the sensors of the base units located in adjacent rooms and/or the hallway outside the room. In this manner the system can track intruders as they move throughout the facility. The base unit(s) 35 respond as discussed above. In this system architecture, the control panel 45 is the master and the sensors and control devices (e.g., keypads, keyfobs) are slave devices. The radio link in this architecture is a star topology with the control panel 45 at the center of the network. The branches include base units 35 and external links, e.g., telephone channel 70 and broadband channel 75.

Other aspects of the present invention are applicable to a security system where a second sensor and image-capture device are not physically integrated inside the same housing. In one such example, an embodiment is arranged with an intrusion sensor to sense an intrusion at a target area of a facility, a second sensor to sense movement, and an image-capture device. The second sensor bears a special relationship (e.g., located sufficiently near and aligned) with the image-capture device to form a common field of view, such that the fields of view for both devices overlap without the devices being located inside a common housing. The image-capture device captures images in response to an intrusion indication from the intrusion sensor and in response to a movement indication from the second sensor.

In more specific embodiments, the various arrangements permit for the devices to be situated in different ways to provide the common field of view. For example, horizontal movement, vertical movement, or horizontal and vertical movement can be provided for each of the motion sensor and the image-capture device, with their movements mirrored to maintain the integrated field of view. More particularly, such mirrored movement can be provided by using a ratchet-like mechanism with devices to provide increment adjustments in the horizontal and/or vertical directions; the skilled artisan would appreciate that such adjustment can be implemented using servo-control motors or be manually implemented using conventional position-stabilizers that permit step-wise/incremental rotation.

In a related embodiment, horizontal movement, vertical movement, or horizontal and vertical movement can be provided for either or both the motion sensor and the image-capture device by way of conventional electronically-implemented pan/tilt/zoom operation(s), with their movements coordinated to maintain the integrated field of view. For image-capture, such pan/tilt/zoom operation is commonly used in digital video-recording devices. The motion detector may also be manipulated to alter the field of view.

In more specific embodiments, the various arrangements can be implemented with a spatial relationship between the motion sensor and the image-capture device by using a common backplate to which each of the motion sensor and the image-capture devices are mounted and/or a template for aligning the motion sensor and the image-capture device for mounting on a wall, where contoured portions of the respective backs of the motion sensor and the image-capture device may provide an offset for biasing the direction of view.

In other specific embodiments, the various arrangements permit for such above-described devices to be situated such that their movement is pre-set before they are used or dynamically controlled while in use with automated or semi-automated coordination provided by the control circuitry and/or personnel at a remote-site center. Such coordinated movement, while maintaining a common field of view, benefits a variety of monitoring and/or security applications.

According to one example embodiment of the present invention, an intrusion sensor, such as a window or door contact, located at a perimeter of a facility detects whether the contact subject, window or door, has been breached. If, for example, a window has been opened, the window contact (intrusion sensor) sends a signal to a corresponding integrated motion sensor/camera located at the interior of the facility. Upon receipt of the intrusion signal, the motion sensor is armed and the integrated camera is set to a "ready" mode without initiating recording. The motion detector remains armed and when motion is detected, the integrated motion sensor/camera is again triggered. Once motion is detected, the camera turns "on" and captures images of the source of the motion. The video images are sent to a central control panel for further evaluation. Further evaluation may include determining (manually or automatically using, e.g., machine visions) whether the source of the motion is human, an animal such as a pet, or another moving object. If the source is determined to be human, further evaluation may reveal whether any identifying images were captured, whether the human is an intruder or an inhabitant of the facility, and face recognition may be used to identify a previously unknown person intruding on the facility.

In another example embodiment, the home entry intrusion sensor (e.g., front door contact) corresponds to a delayed-response motion sensor such that the transmission of the motion indication is delayed to accommodate a security system control keypad located near the entrance. In another zone located nearby, such as a kitchen, the motion indication is not delayed when motion is detected. The system recognizes that motion sensed in the nearby room (e.g., person setting grocery bags down in the kitchen) following a delayed sensing of motion in the entry zone is likely an authorized user and an alarm will not sound for a predetermined length of time. If the system is not deactivated or reset before the predetermined length of time expires, the alarm will sound. The number of nearby zones configured with such a relationship with the delayed motion indication in the entry zone should be limited to ensure that an actual intruder is not provided enough time to traverse the premises without being detected.

In a further example embodiment, the security system is equipped to capture an image of the person arming or disarming the system (e.g., by entering a code on a security system control keypad) to determine if the person is an authorized user. In one instance, the captured image can be sent to a remote monitoring station for verification or stored for future reference. In another instance, the security system can be programmed with images of the authorized users and the system uses face recognition to compare the captured image of the person attempting to arm/disarm the system with the images of the authorized users to determine whether the person is an authorized user. If the person's image matches that of an authorized user, then the person is allowed to arm/disarm the system. In one implementation, the security system control keypad is equipped with a camera to capture an image of the person entering a code. In another implementation, a base unit 35 is positioned such that the base unit's camera 25 can capture an image of the person entering a code on the security system control keypad. In response to a code being entered, the security system control keypad activates the camera 25 to capture an image of the person entering the code.

In an additional example embodiment, the security system is equipped with a self diagnostic mode that is used to determine if the system is functioning properly. The system sends test signals representing intrusion detections by various sensors to the base stations 45 to determine that the appropriate sensors 20 are armed and/or the appropriate cameras 25 are activated. The system can also enable each of the cameras 25 to capture an image to check that the cameras are working. The results of the diagnostic tests can be displayed for the system user, saved for future review or provided to a remote monitoring station.

Figure 2:
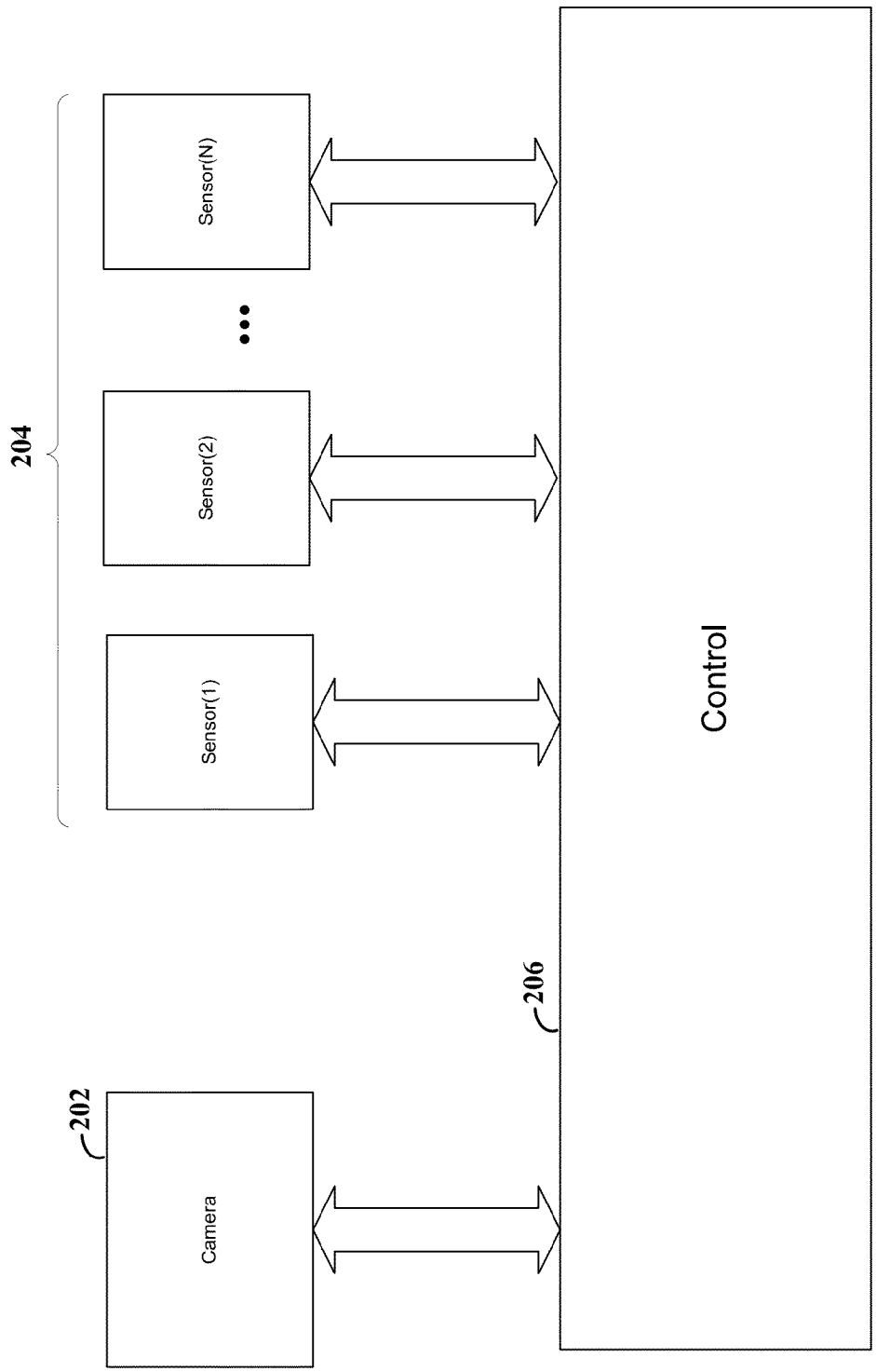
FIG. 2 shows a block diagram of a security system for mapping a plurality of sensors to a camera, according to an example embodiment of the present invention.

FIG. 2 shows a block diagram of a security system for mapping a plurality of sensors to a camera, according to an example embodiment of the present invention. Control block 206 interfaces with sensors 204 (i.e., sensor(1) to sensor(N)) and camera 202. Control block 206 receives input from sensors 204 regarding the status of the sensor. For instance, a particular sensor may send a message to control block 206 in response to a window or door being opened. Control block 206 can then make a determination as to whether camera 202 should be activated. In one implementation, control block 206 has a mapping or lookup table that links one or more of the sensors to camera 202. In this fashion the response of control block 206 to one or more of sensors 204 can be limited to sensors that correspond to the room or field of view covered by camera 202. In some instances, control block 206 can receive images from camera 202 and also forward the images to a monitoring station, using a telephone or network interface. Moreover, in some instances, camera 202 is able to pan, tilt, zoom or otherwise change the field of view to correspond to the particular sensor that was triggered.

According to an example embodiment of the present invention, sensors 204 and camera 202 announce their presence to control block 206 during an initialization stage. A user of the system can select from these devices when determining what sensors camera 202 should be configured to respond to. In one instance a graphical user interface can be used to allow for ease of configuration. In another instance, a graphical display of the location of the sensors 204 and camera 202 can be used to allow a user to easily select and configure the system. Such configuration can be limited to implementation during installation of the security system, or can be implemented throughout the use of the security system. For instance, given that sensors 204 can optionally be wireless, it is possible that the sensors may be moved from time to time. This may be necessary where the function of a room changes or where the structure undergoes changes. Moreover, sensors can be added or replaced at later dates.

In certain instances, camera 202 can operate in different modes that may or may not be responsive to sensors 204. For example, one mode may disable camera 202 completely, while another mode may enable camera 202. One such mode would include control block 206 enabling cameras 202 in response to one or more selected sensors 204. In one embodiment of the present invention, different modes may have different sensors mapped to camera 202. For instance, one mode may have a door sensor mapped to camera 202, while another mode may have both a door sensor and a motion sensor mapped to camera 202 (e.g., for when there should be no authorized occupant in the area). The system can be programmed such that a different code is used to identify each of these modes of operation. The system user enters one of the codes (e.g., on a security system control keypad) to select the desired mode of operation. In one implementation, the system user enters a security access code and then selects from one of the programmed modes of system operation that are identified on a display screen (e.g., by selecting a corresponding icon on a touch screen or by entering a number identifying one of the modes). In another implementation, the system user enters a code for each mode of operation. This can be useful for allowing different levels of access/mode settings for different users. For instance, a child, friend or relative could be given only certain codes. This is particularly useful for controlling access to configuration settings or preventing access during restricted time periods, such as late at night.

In a particular instance, one of the codes may correspond to a sequence of image captures from various cameras. Thus, a user of the system can initiate a sequence of camera shots to view different areas of the facility. This can be particularly useful for assuring a user that there are no intruders or for monitoring the status of an occupant (e.g., a small child or otherwise vulnerable person) and the house in general (e.g., to check for fire or damage due to natural disasters).

In connection with the embodiments discussed herein as examples of the present invention, the camera can be enabled in various ways. Generally, enabling of the camera includes enabling the camera arrangements discussed in connection with FIGS. 1-3. Accordingly, when a sensor mapped to a camera arrangement detects a potential intruder, the motion detector of the camera arrangement is enabled. If the motion detector senses motion, the camera can then be enabled to capture pictures of potential intruders. In an alternative mode, the camera can also be configured to immediately capture pictures (e.g., regardless of the motion detector) in response to the detection of a potential intruder. This can be particularly useful for sensors that do not necessarily correspond to an intruder (e.g., fire alarm) and for high security modes that do not implement a delay or second level of motion detection. In such a mode, the camera would capture images independent of motion detection by the motion sensor. Another mode or setting could be used to distinguish between video capture (e.g., consecutive shots over a period of time capable of showing motion, such as those stored in an MPEG file) and still image capture (e.g., one or more individual images that can be stored using file formats such as JPEG) by the camera. Accordingly, in response to a sensor and a selected mode, the system can be configured to 1) capture images after detecting motion in the field of view, 2) immediately capture video, and 3) immediately capture a still image. These and other configuration options can be implemented using the various mapping features discussed herein.

Figure 3:
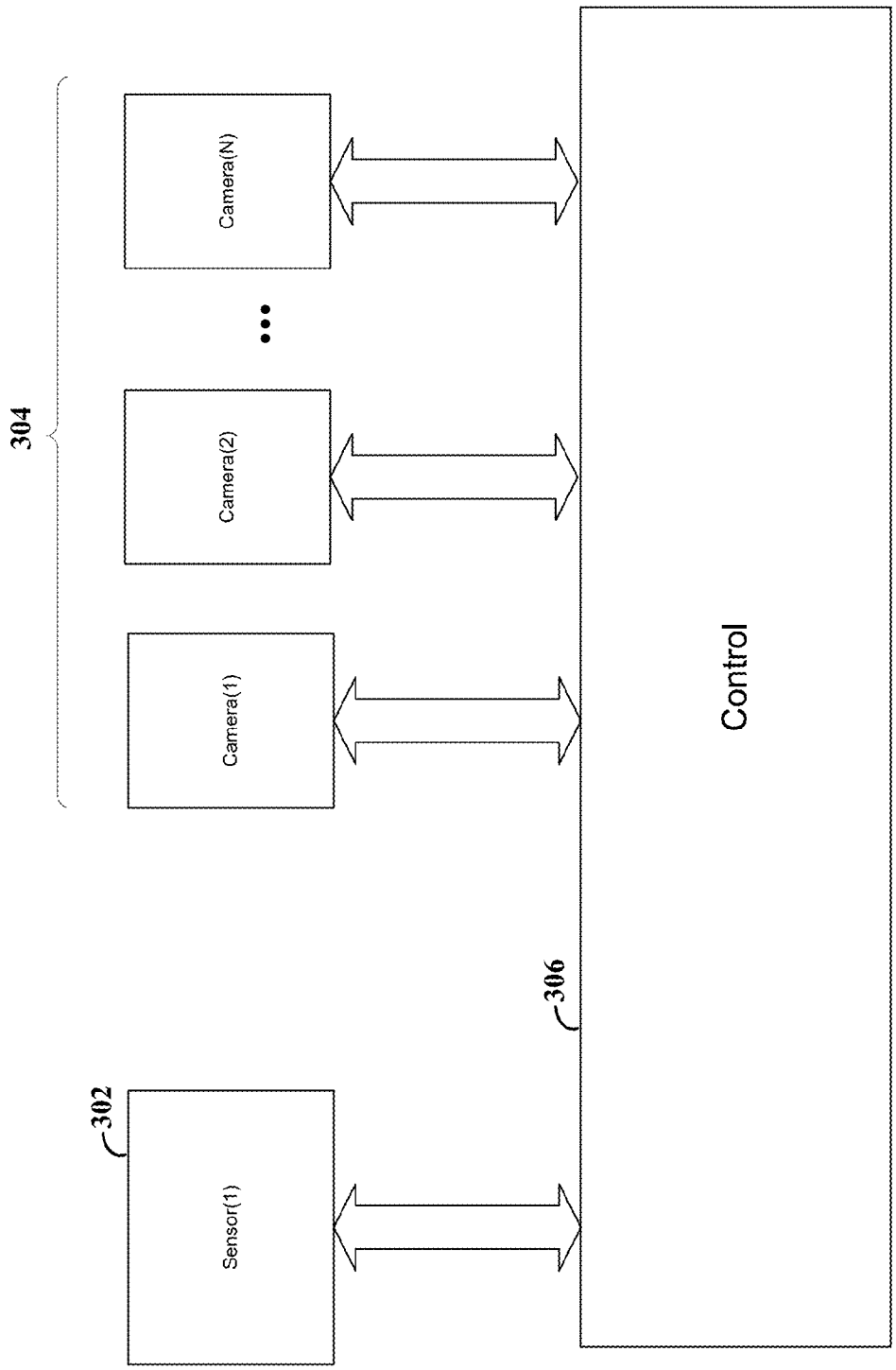
FIG. 3 shows a block diagram of a security system for mapping a plurality of cameras to a sensor, according to an example embodiment of the present invention.

FIG. 3 shows a block diagram of a security system for mapping a plurality of cameras to a sensor, according to an example embodiment of the present invention. As discussed above, sensor 302 and cameras 304 (i.e., camera(1) to camera(N)) communicate with control block 306. In response to input from sensor 302, one or more of cameras 304 can be enabled. As discussed in connection with FIG. 2 and elsewhere herein, the control block 306 can implement the desired correspondence between cameras 304 to sensor 302 using mapping database or lookup table. This can be advantageous where the cameras provide different angles of view and/or different fields of view. For instance, in response to window sensor, several cameras can be enabled, allowing for security monitoring stations to view the entire room, and also to have a better chance of identifying a potential intruder.

In one embodiment of the present invention, multiple cameras can be selectively linked to multiple sensors. For instance, all cameras and sensors within a room can be linked together. Accordingly, the mapping of both FIG. 2 and FIG. 3 can be used in conjunction with each other.

FIG. 4 shows an example mapping or lookup table, according to an example embodiment of the present invention. The data contained in the mapping table can be stored in a suitable memory device, such as flash, random-access-memories, hard drives and the like. In some applications it can be advantageous to use nonvolatile memory for guarding against problems due to power loss.

Column 402 contains camera-1 to camera-N. It should be noted that FIG. 4 and the relevant discussion make reference to camera-1 to camera-N. As discussed herein, such cameras may include an integrated motion detector, and thus, identification information as to whether the camera device includes such an integrated motion detector may also be stored in the mapping or lookup table. Column 404 contains sensors that are configured to enable the camera arrangement in the corresponding row. For instance, sensors A, B and C would enable camera 1, while sensors X, Y and Z would enable camera 2. In this manner a user of the system provides information as to the desired associations between sensors and cameras resulting in a corresponding change in the data in the mapping table. For example, a graphical user interface can be presented to a user through a software application running on a processor. In one instance, the processor is a general purpose computer, such as a personal computer or personal digital assistant, that can interface with the control device of the security system using, for example a universal-serial-bus (USB), Ethernet or similar interface. In another instance, the processor is part of the control device.

Column 406 contains additional information regarding relationships between sensors and cameras. In one instance, column 406 represents sensors that enable the corresponding camera when the security system is in a particular mode (i.e., a different mode than column 404 would be associated with). This is useful to distinguish between situations where the occupants are awake from when they are sleeping, windows that are opened from the inside from windows that are opened from the outside, situations where the occupants are on vacation from when they are not, and the like. In another instance, column 406 represents sensors that need to be triggered prior to sensors in column 404 activating a camera in column 402. Thus, the sensors can be linked to each other, thereby requiring a succession of sensors to be triggered prior to activation of a mapped camera. In yet another instance, column 406 represents sensors that are only enabled after a certain delay. This can be particularly useful for enabling sensors that are in the likely path of an intruder. For instance, the camera in a bedroom may be enabled after a window sensor in the bedroom is triggered. After a delay sufficient to allow an intruder to traverse the room, a sensor from column 406 and corresponding to an adjoining room can be enabled.

Column 408 represents additional data used to supplement the mapping functions. In one instance, column 408 may contain information relating to cameras that are only enabled after a certain delay. This can be particularly useful for enabling cameras that are in the likely path of an intruder. For instance, the camera in a bedroom may be enabled after a window sensor in the bedroom is triggered. After a given delay (e.g., sufficient to allow an intruder to traverse the room) a camera in an adjoining room can be enabled. In another instance, column 408 may contain data that contains delay values for enabling the cameras or sensor of column 404 and 406. In yet another instance, the data in column 408 can be used to denote one or more security modes for which the sensors and cameras stored in the respective mapping table columns are enabled or disabled.

According to another embodiment of the present invention, a combination of sensor events and the details of the sensor events can be selected to further define enabling events for various cameras. In addition to requiring a sensor to be triggered, combinational events can be used to determine details, such as whether a series of sensor events represent a person leaving or entering an area. More specifically, the order of sensor events and the absence of certain sensor events can be used to determine the direction a person is traveling, the number of people present and other security factors. Using information relative to the sequences of events, the system can be configured to avoid unnecessary video capture of normal occurrences, such as the exit of an authorized person from a secured area, while still capturing abnormal occurrences, such as the entrance of a person to the secured area.

Additional data storage elements of the mapping table (e.g., similar to columns 406 and 408) are possible and only limited by practical considerations, such as complexity and storage space.

Figure 5:
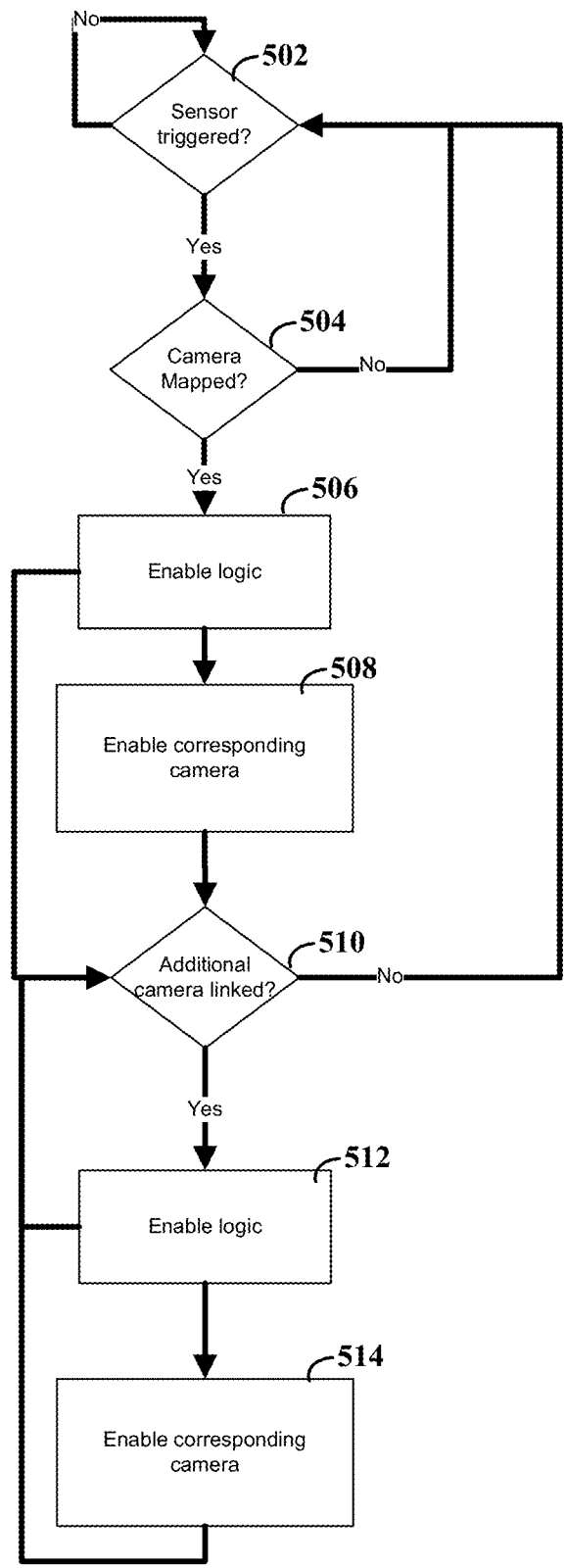
FIG. 5 shows a flow diagram for logic for implementing a process to enable security cameras in response to mapped sensors, according to an example embodiment of the present invention.

FIG. 5 shows a flow diagram for logic for implementing a process to enable security cameras in response to mapped sensors, according to an example embodiment of the present invention. Block 502 represents a decision as to whether a sensor has been triggered. The process waits at block 502 for a sensor to be triggered. If a sensor is triggered, the process proceeds to block 504. Block 504 determines whether the sensor is mapped to a camera. If no camera is mapped to the sensor, the process returns to block 502 and waits for another sensor to be triggered. If a camera is mapped to the sensor, the process proceeds to block 506.

Block 506 represents potential enable logic. In the simplest case, the enable logic depicted by block 506 need not be implemented. In such a case, the process proceeds directly to block 508. In other instances, various determinations, delays and other functions can be carried out at block 506. In a particular embodiment of the present invention, information stored in a mapping table is used to implement the enabling logic. As discussed herein, such information may represent different logic for different modes, delays before enabling and the like. In some instances, the logic may determine that no camera should be enabled and the process proceeds to block 510. One such instance is where the security system is in a mode for which the linked camera is not to be enabled. In another instance, the logic may enable other sensors prior to enabling the camera. After determining that the camera should be enabled the process proceeds to block 508 to enable the camera.

The process next checks for additional cameras that are linked to the triggered sensor as shown by block 510. If no additional camera is found, the process returns to block 502. If an additional camera is found, the process proceeds to block 512. Block 512 is a logic block similar to block 506, where the process can branch to blocks 510 or 514. Block 514 enables the corresponding camera and returns to block 510 to determine if additional cameras are mapped to the triggered sensor. In this manner, a series of cameras can be enabled in response to one or more triggered sensors. This is particularly useful for enabling cameras along a likely path of an intruder.

The various components of such a process can be implemented using one or more general purpose processors configured with appropriate software, one or more custom processors, programmable logic devices, analog/digital circuits, integrated circuit devices and combinations thereof.

Figure 6:
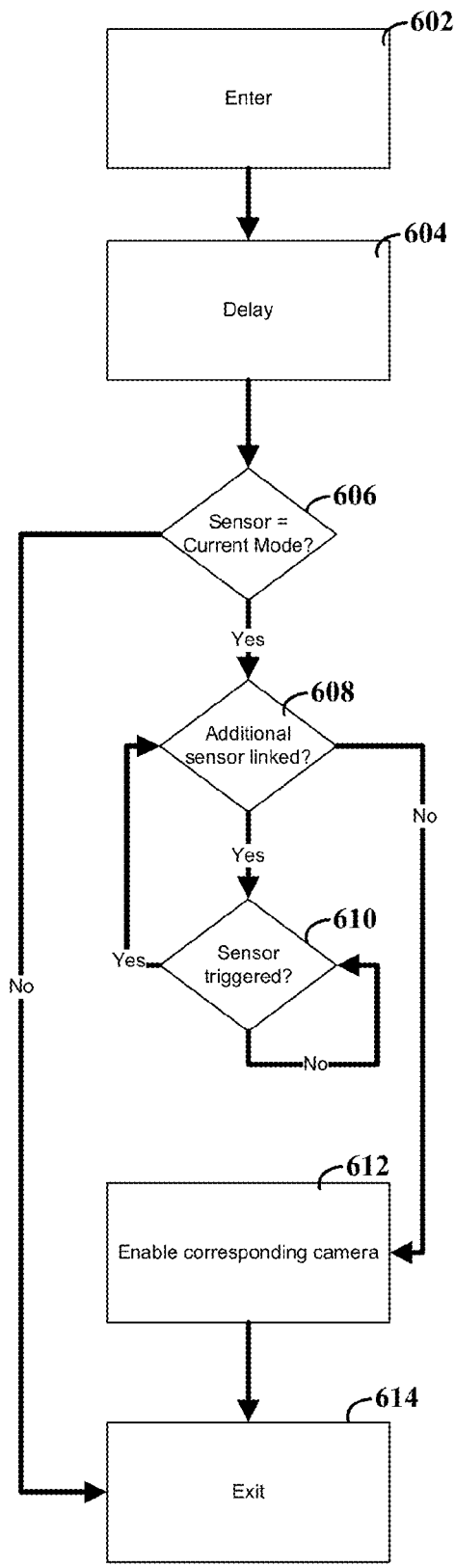
FIG. 6 shows a flow diagram for logic used to enable cameras for a security system, according to an example embodiment of the present invention.

FIG. 6 shows a flow diagram for logic used to enable cameras for a security system, according to an example embodiment of the present invention. In a particular embodiment this logic can be implemented in place of enable logic blocks 506 and 512 (e.g., as a function call in a software routine). The process begins at block 602 where it proceeds to block 604. Block 604 can implement a delay before enabling any cameras. If no delay is required, the delay step can be skipped. In one instance, the delay can be a fixed delay for each camera. In another instance, the delay can be a function of data stored in the mapping table along with other variables, such as the current mode of the security system. After the delay, if any, is implemented, the process proceeds to block 606. At block 606, a determination is made as to whether the sensor is configured to enable the camera relative to the current security mode. This can be accomplished, for example, by a comparison of the data in the mapping table with the current security mode. If it is determined that the camera should not be enabled in response to the sensor, the process exits as shown by block 614. Otherwise the process proceeds to block 608.

At block 608 a determination is made as to whether additional sensors are linked (e.g., required to be triggered) relative to the corresponding camera. This is useful for configuring the camera to only be triggered in response to more than one sensor. If it is determined that no additional sensors are linked, the process proceeds to block 612 where the corresponding camera is enabled. The process then exits as shown by block 614.

If at least one additional sensor is linked, the process proceeds to block 610. At block 610 a determination is made as to whether the linked sensor is triggered. If the linked sensor is not triggered, the process can wait at block 610 until the linked sensor is triggered. In some instances, it is desirable to reset or exit from this state even if the linked sensor is not triggered. This can be accomplished using various methods. Using one such method, a timer can precipitate the exit from state 610. Using another such method, the process exits from state 610 in response to an external event, such as the resetting of the triggered sensor(s). If the linked sensor is triggered, the process returns to block 608 to check for other linked sensors.

Figure 7:
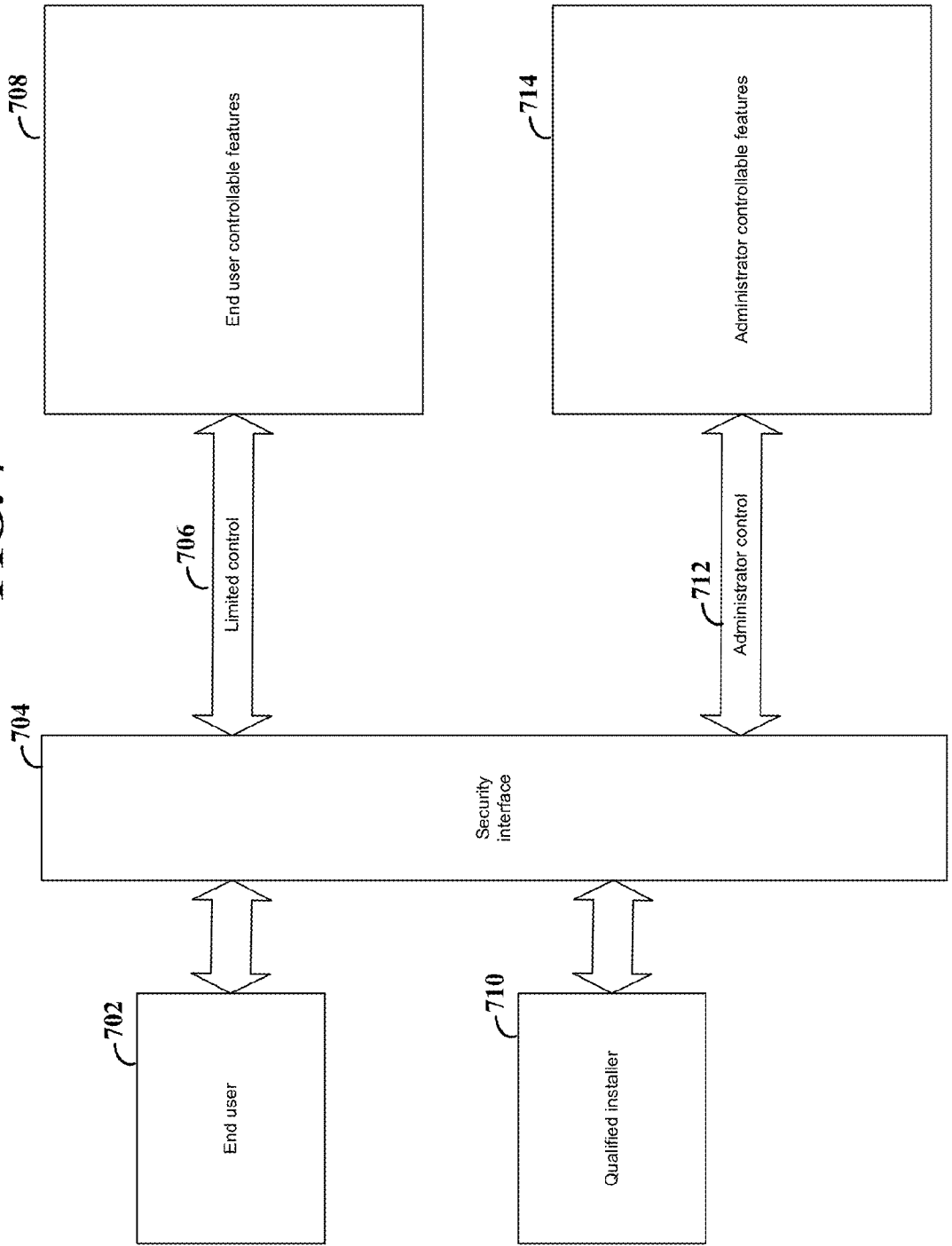
FIG. 7 shows a block diagram of an interface for implementing differing levels of access to a security system, according to an example embodiment of the present invention.

FIG. 7 shows a block diagram of an interface for implementing differing levels of access to a security system, according to an example embodiment of the present invention. FIG. 7 depicts a security interface 704 that provides two control/access levels 706 and 712 for different users of the system. The different control levels can be particularly useful for simplifying the control aspects available to an end user 702, while allowing additional functionality to be configured by a qualified installer 710. The control levels can also be particularly useful for reducing the risk of an end user 702 improperly configuring the security system, by limiting the control of certain aspects of the system. Thus, the security system can be configured such that a minimum level of security is maintained, regardless of the end user 702 configuration changes.

Security interface 704 is accessed using a number of different mechanisms. A non-exhaustive list of acceptable interfaces includes a general purpose computer connected through Ethernet, USB or the like, key pads, touch screens, voice response systems and keyfobs. Security interface 704 provides a different level of access depending upon the user. In one instance, the user credentials can be determined by a username and/or password, electronic identification cards, wireless transmitters, biometric identifications or the like. Once the user credentials are determined, the user is granted an appropriate level of control over the system as shown by blocks 708 and 714. The number of different levels of control and user can vary depending upon the particular application. For example, a first level (e.g., full access) may exist for an installer of the system; a second level (e.g., limited access) may exist for home owners and a third level (e.g., mode change only) may exist for children of the home owners.

Figure 8:
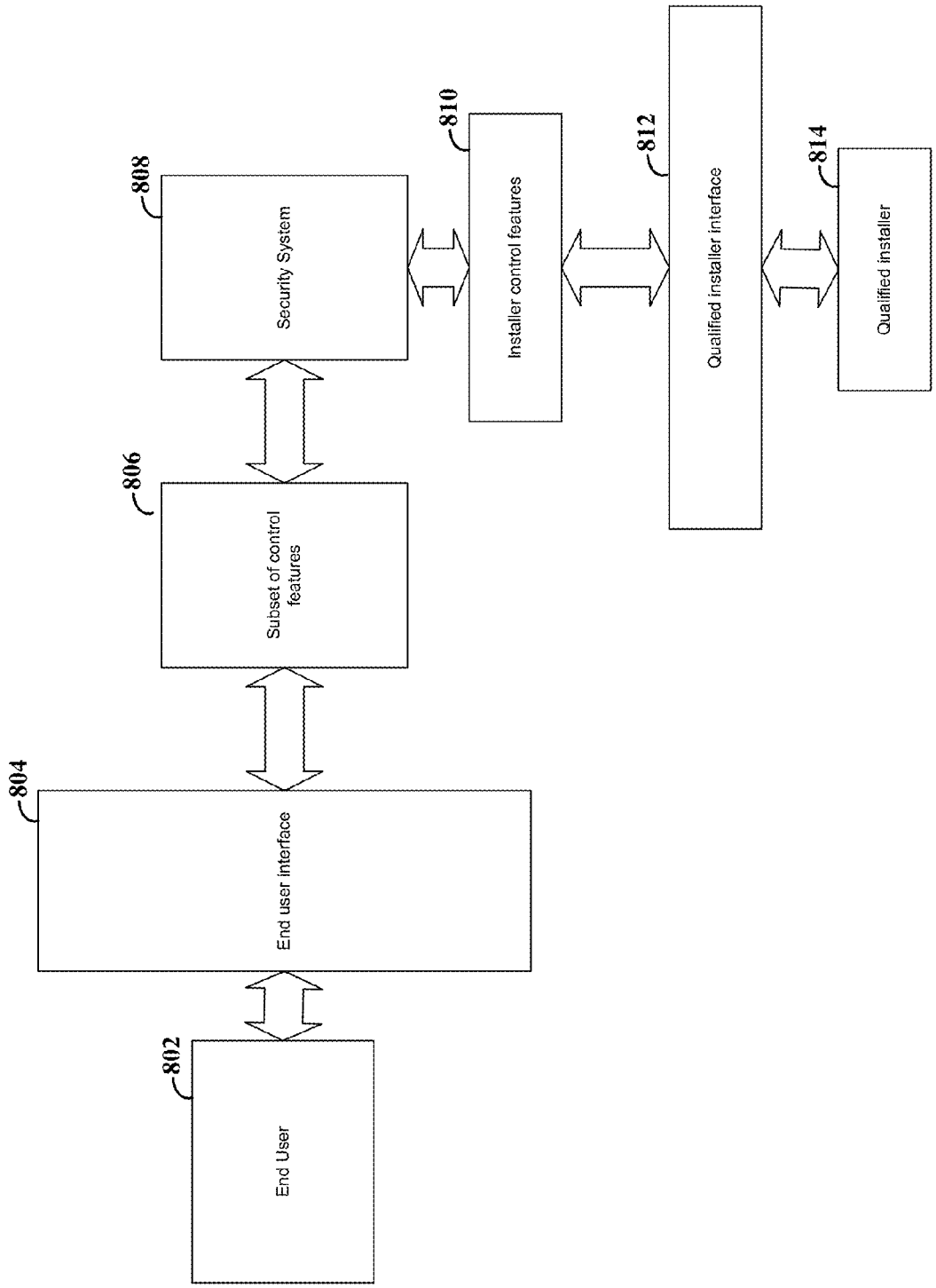
FIG. 8 shows a block diagram of another interface for implementing differing levels of access to a security system, according to an example embodiment of the present invention.

FIG. 8 shows a block diagram of an interface for implementing differing levels of access to a security system, according to an example embodiment of the present invention. FIG. 8 depicts a security system 808 that allows end user 802 access using end user interface 804 and qualified installer 814 access using qualified installer interface 812. By providing multiple interfaces to the system with different levels of control, the security system 808 can be further protected. For instance, subset of control features 806 could be provided through a touch screen or local computer. Such interfaces may be subject to potential security risks (e.g., hacking into the computer remotely or gaining access to the touch screen prior to when the system is not armed) that may compromise the security system. By limiting the control available through the end user interface, the overall security can be improved. A higher level of control (e.g., installer control features 810) can be provided using a more secure interface method. For example, the interface might only accept a security card that is controlled by the installer, or it may only accept instructions from a known server or input port. Accordingly, the security system is not entirely compromised simply by compromising the end user interface 804. This can also be particularly useful for limiting the complexity by essentially hiding certain configuration options from the end user.

Figure 9:
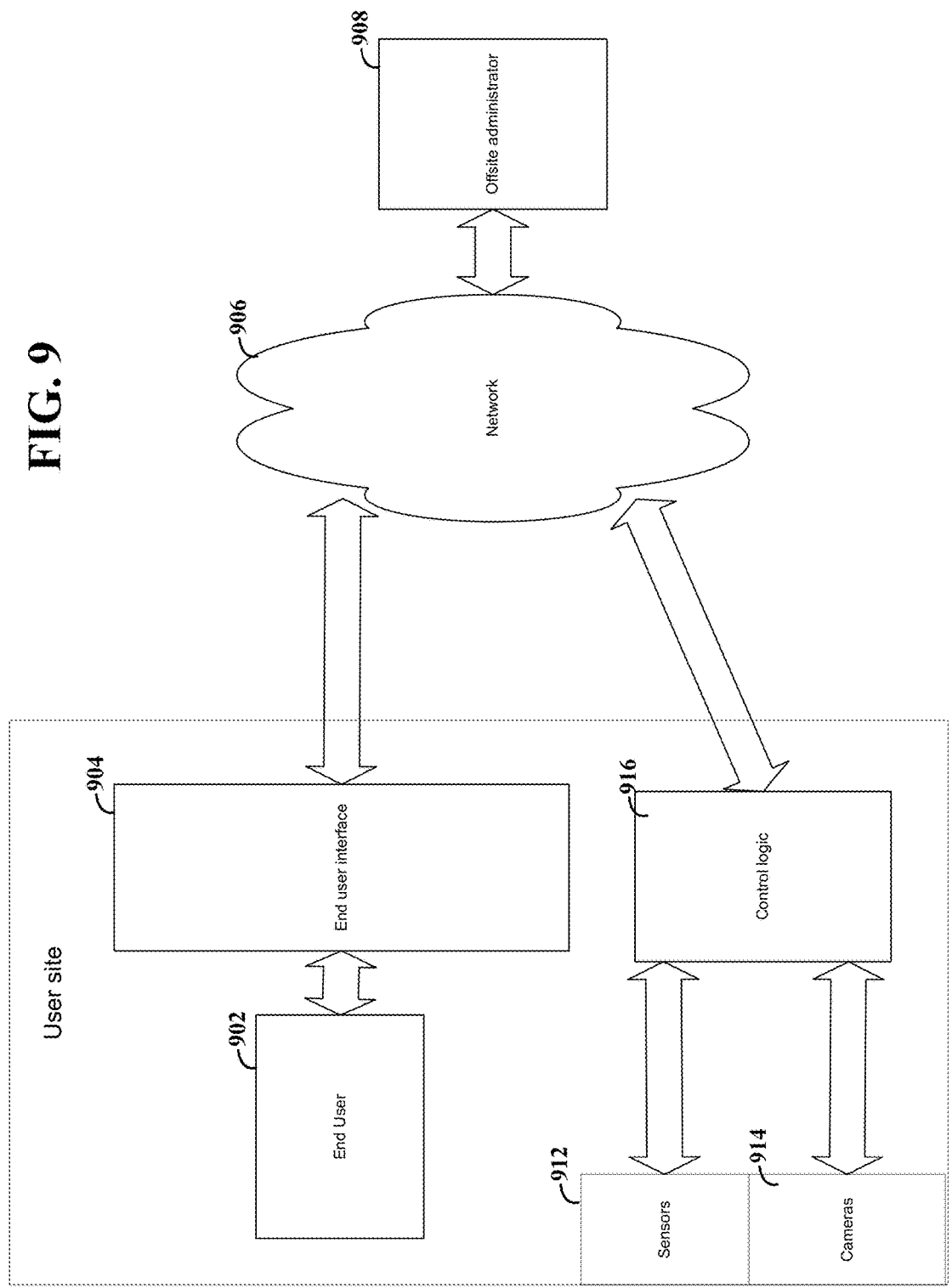
FIG. 9 shows a block diagram of another interface that provides administrative monitoring of configuration settings for a security system, according to an example embodiment of the present invention.

FIG. 9 shows a block diagram of another interface that provides administrative monitoring of configuration settings for a security system, according to an example embodiment of the present invention. FIG. 9 depicts an end user interface 904 that allows end user 902 to access control logic 916. End user interface 904 sends data to and from end user 902 using network 906. End user is able to configure control logic 916 and monitor the status of sensors 912 and cameras 914 through such data transfers. Offsite administrator 908 provides monitoring functions for all or a subset of end user transactions. For instance, offsite administrator 908 can monitor configuration settings for control logic 916 to verify that the system is not compromised due to user error or an unauthorized person. In some instances, the monitoring can be limited to critical functions, such as disabling sensors 912 and cameras 914. In other instances, the monitoring can encompass all transactions. This monitoring can be accomplished using an automated process that follows a rule set designed to identify potential issues. The monitoring can also be accomplished using (alone or in combination with automated processes) human operators that watch for potential problems.

While certain aspects of the present invention have been described with reference to several particular example embodiments, those skilled in the art will recognize that many changes may be made thereto. For example, aspects of the underlying patent documents include, e.g., aspects that provide integration on fields of view, and implementation details of the integrated image-capture and motion-sensing devices. Such changes do not necessarily depart from the spirit and scope of the present invention. Aspects of the invention are set forth in the following claims.

What is claimed is:

1. An integrated security arrangement, comprising:
   a plurality of intrusion sensors configured and arranged to generate intrusion signals;
   a motion sensor configured and arranged with a field of view to sense motion in a target area and, in response, to generate a motion indication signal;
   a camera device physically integrated with the motion sensor to capture images of the target area in response to the motion indication signal from the motion sensor;
   a communication device, including circuitry and configured to send data indicative of detected motion and to communicate with at least one of the intrusion sensors by receiving the intrusion signals;
   a housing configured to contain the motion sensor, the camera device and the communication device; and
   a control panel including a memory circuit with a mapping database that contains data that associates, for a first mode, a first set of the plurality of intrusion sensors with the camera device and associates, for a second mode, a second set of the plurality of intrusion sensors with the camera device, and additional data specifying a delay for enabling the camera device in response to the corresponding set of intrusion sensors, the control panel configured and arranged to permit a user to configure the mapping database by changing the data associations for the first and second modes, and to operate in:

the first mode, in response to a first user selection, the first mode causing the camera device to capture images of the target area in response to tripping of an intrusion sensor from the first set of the plurality of intrusion sensors and after a delay as indicated by the additional data; and in the second mode, in response to a second user selection, the second mode causing the camera device to capture images in response to an intrusion sensor from the second set of the plurality of intrusion sensors being tripped and after a delay as indicated by the additional data; and wherein the control panel is configurable to cause the camera device and another camera device to capture images consecutively in an order that is defined by the mapping database and that specifies sequentially enabling cameras corresponding to an indicated or likely path of an intruder.

2. The integrated security arrangement of claim 1, wherein the intrusion sensor is one of a window contact and a glass-break detector.

3. The integrated security arrangement of claim 1, wherein the first user selection and the second user selection are different security codes entered at the control panel.

4. The integrated security arrangement of claim 1, wherein the control panel is configurable to cause the camera device to capture images of the target area in response to a signal from a sensor, the signal representing a detectable situation, and wherein the signal is directly provided to the camera device.

5. The integrated security arrangement of claim 1, wherein the communication device is configured to transmit signals to the control panel, the control panel is remotely-located from the communication device.

6. The integrated security arrangement of claim 1, wherein multiple sensors are linked in the mapping database, thereby requiring more than one sensor to be tripped prior to the camera device capturing pictures.

7. The integrated security arrangement of claim 1, wherein the camera device is used to differentiate between images of a human and another moving object.

8. The arrangement of claim 1, where the control panel is configurable to override the associations in the database for the camera device to cause the camera device to capture images of the target area in response to a sensor signal.

9. The integrated security arrangement of claim 1, wherein the camera device includes and is integrated with the motion sensor, and wherein the control panel is further configured to provide a user interface that includes icons for configuring the mapping database.

10. The integrated security arrangement of claim 1, wherein the camera device includes and is integrated with the motion sensor, and further including a user interface that receives data for configuring the mapping database, and wherein configuring the mapping database is limited based upon a control level associated with a user that is configuring the mapping database.

11. The integrated security arrangement of claim 10, wherein configuring the mapping database is limited based upon a different control level for a different user.

12. The integrated security arrangement of claim 1, wherein, responsive to data stored in the mapping database, a second camera device is configured to capture images in response to a first camera device capturing images.

13. The integrated security arrangement of claim 1, further including a user interface and an installation interface that each receive input for configuring the mapping database, wherein the user interface has a first level of access to the mapping database and the installation interface has a second level of access to the mapping database, wherein said first level of access is a subset of said second level of access.

14. The integrated security arrangement of claim 1, wherein, in the first mode, the camera device captures one or more still images and, in the second mode, the camera device captures video images.

15. The integrated security arrangement of claim 1, further including a user interface that receives data for configuring the mapping database, and wherein the mapping database stores data identifying the camera device and each of the plurality of intrusion sensors.

16. The integrated security arrangement of claim 15, wherein the user interface is configured to receive data for configuring the mapping database, and wherein the user interface is one of a personal computer running software configured to interface with the control panel through a communication link, a keypad and a remote server.

17. The integrated security arrangement of claim 1, wherein the order defined by the mapping database specifies sequentially enabling cameras that are in a likely path of an intruder.

18. The integrated security arrangement of claim 1, wherein the order defined by the mapping database specifies enabling the camera in response to a succession of sensors being triggered.

19. An integrated security arrangement, comprising:
a plurality of intrusion sensors configured and arranged to generate intrusion signals;
a motion sensor configured and arranged with a field of view to sense motion in a target area and, in response, to generate a motion indication signal;
a camera device physically integrated with the motion sensor to capture images of the target area in response to the motion indication signal from the motion sensor;
a communication device, including circuitry and configured to send data indicative of detected motion and to communicate with at least one of the intrusion sensors by receiving the intrusion signals;
a housing configured to contain the motion sensor, the camera device and the communication device; and
a control panel including a memory circuit with a mapping database that contains data that associates, for a first mode, a first set of the plurality of intrusion sensors with the camera device and associates, for a second mode, a second set of the plurality of intrusion sensors with the camera device, and additional data specifying a delay for enabling the camera device in response to the corresponding set of intrusion sensors, the control panel configured and arranged to permit a user to configure the mapping database by changing the data associations for the first and second modes, and to operate in:
the first mode, in response to a first user selection, the first mode causing the camera device to capture images of the target area in response to tripping of an intrusion sensor from the first set of the plurality of intrusion sensors and after a delay as indicated by the additional data; and
in the second mode, in response to a second user selection, the second mode causing the camera device to capture images in response to an intrusion sensor from the second set of the plurality of intrusion sensors being tripped and after a delay as indicated by the additional data; and wherein the control panel is configurable to cause the camera device to capture images in response to an order of sensor events and the absence of at least one sensor event.

* * * * *